(12) United States Patent
Than et al.

(10) Patent No.: US 6,719,564 B2
(45) Date of Patent: Apr. 13, 2004

(54) SPACE SIMULATION CHAMBER AND METHOD

(75) Inventors: Yatming R. Than, Hopkinton, MA (US); David A. McWilliams, Groton, MA (US)

(73) Assignee: Chart Inc., Mayfield Heights, OH (US)

( * ) Notice: Subject to any disclaimer, the term of this patent is extended or adjusted under 35 U.S.C. 154(b) by 86 days.

(21) Appl. No.: 09/979,758

(22) PCT Filed: Mar. 22, 2001

(86) PCT No.: PCT/US01/09303

§ 371 (c)(1),
(2), (4) Date: Mar. 19, 2002

(87) PCT Pub. No.: WO01/75841

PCT Pub. Date: Oct. 11, 2001

(65) Prior Publication Data

US 2003/0096215 A1 May 22, 2003

Related U.S. Application Data

(60) Provisional application No. 60/191,160, filed on Mar. 22, 2000.

(51) Int. Cl.⁷ ............................... G09B 9/00; B01D 8/00
(52) U.S. Cl. ....................................................... 434/34
(58) Field of Search ............................ 434/29, 34, 365, 434/372; 62/55.5, 268; 165/104.32; 244/163; 220/240; 250/251, 281, 423 R, 427, 492.1; 141/1; 428/34, 137; 240/265; 359/619, 896

(56) References Cited

U.S. PATENT DOCUMENTS

| | | | | |
|---|---|---|---|---|
| 3,566,960 A | * | 3/1971 | Stuart | 165/104.31 |
| 3,568,874 A | * | 3/1971 | Paine et al. | 220/240 |
| 3,710,279 A | * | 1/1973 | Ashkin | 250/281 |
| 3,825,041 A | * | 7/1974 | Cornog | 141/1 |
| 4,550,979 A | * | 11/1985 | Meier | 359/896 |
| 4,625,521 A | * | 12/1986 | Murphy et al. | 62/55.5 |
| 4,678,438 A | * | 7/1987 | Vykukal | 434/34 |
| 4,742,232 A | * | 5/1988 | Biddle et al. | 250/427 |
| 4,978,438 A | * | 12/1990 | Shimamune et al. | 204/265 |
| 5,455,085 A | * | 10/1995 | Miller | 428/34 |

* cited by examiner

Primary Examiner—Joe H. Cheng
(74) Attorney, Agent, or Firm—Calfee, Halter & Griswold LLP

(57) ABSTRACT

A space simulation chamber for simulating the temperature and pressure conditions of deep space comprises a vacuum chamber containing a thermal shroud and a coolant system for cooling the thermal shroud by heat exchange with helium gas.

11 Claims, 3 Drawing Sheets

SPACE SIMULATION CHAMBER AND METHOD

CROSS-REFERENCE TO RELATED APPLICATION

This application is based on Provisional Application 60/191,160, filed on Mar. 22, 2000, the disclosure of which is incorporated herein by reference.

BACKGROUND

In order to test the design and quality of spacecraft and their components, space simulation chambers are often employed to simulate the temperature and vacuum conditions of outer space. Although high vacuums and temperatures as low as 3° K are experienced in deep space, past history has established that vacuum pressures of less than 1 $E^{-5}$ Torr and temperatures less than 100° K are sufficient to provide the necessary testing conditions. Also, because spacecraft and their components are exposed to a broad range of temperatures in use, including 293° K at the earth's surface and the 3° K background temperature of deep space, testing at temperatures varying between about 293° K and 100° K or less is also desirable.

Space simulation chambers typically include a vacuum chamber containing a thermal shroud, or insulation layer, which defines a test cavity for receipt of the test component. A gaseous nitrogen cooling system is also typically provided for cooling the thermal shroud, and hence the test cavity, to the desired temperatures.

Currently-available space simulation chambers can be divided into two different types. In the first type, which is illustrated in FIG. 1, cooling of the test cavity is done solely with gaseous nitrogen. As shown in FIG. 1, space simulation chamber 10 includes gaseous nitrogen cooling system 11 for controlling the temperature of thermal shroud 12 located within a vacuum chamber 14 by heat exchange between the cooled recycled nitrogen gas and the thermal shroud. Gaseous nitrogen is circulated through cooling system 11 by blower 16 and heated or cooled to reach the desired temperature by either a heater 18 or a cooler 20. In the particular embodiment shown, cooler 20 takes the form of a heat exchanger for heat exchange between the gaseous nitrogen in cooling system 11 and externally supplied liquid nitrogen. A pressure controller 22 can be used in conjunction with a gaseous nitrogen inlet valve 24 and a gaseous nitrogen release valve 26 in order to maintain a constant pressure in cooling system 11. Alternatively, cooling system 11 can be operated at a constant density, constant volume flow, whereby the gaseous nitrogen pressure varies in proportion to the absolute temperature.

A problem with this system is that gaseous nitrogen cannot effectively operate as a coolant at temperatures below 100° K. As temperatures approach 100° K, gaseous nitrogen starts to condense, which makes the system virtually impossible to control. Therefore, such systems are typically operated at a lower limit of 110° K in order to maintain control. Moreover, because of the relatively low heat transfer properties of gaseous nitrogen, such systems must be operated with undesirably high volume flow rates, pressure drops and power consumption.

The second type of currently-available space simulation chamber is illustrated in FIG. 2, in which the same reference numbers are used as in FIG. 1. As shown in FIG. 2, this space simulation chamber also includes vacuum chamber 14, thermal shroud 12 and gaseous nitrogen cooling system 11. In addition, this simulation chamber further includes liquid nitrogen cooling system 42 for supplying liquid nitrogen to thermal shroud 12 for heat exchange between the recycled liquid nitrogen coolant and the thermal shroud.

In the particular embodiment shown, liquid nitrogen system 42 includes a liquid nitrogen supply tank 44, liquid nitrogen supply line 46 and gas vent 48. Liquid supply line 50 is adapted to feed liquid nitrogen from supply tank 44 directly into the same coolant tubes in thermal shroud 12 which receive the gaseous nitrogen. Because controlling mixed gaseous/liquid nitrogen streams is difficult, suitable valving is provided to enable these coolants to be fed through thermal shroud 12 in an alternate fashion. This valving takes the form of a set of isolation valves 60, as well as a purging system for the liquid nitrogen system including liquid nitrogen drain 52, drain valve 54, gaseous nitrogen purge line 56, and purge valve 58. As an alternative to this approach, liquid nitrogen can be supplied to and withdrawn from shroud 12 through separate coolant lines.

The space simulation chamber of FIG. 2 can be operated in two different modes, a variable shroud temperature mode and a constant shroud temperature mode. In the variable shroud temperature mode, the temperature of thermal shroud 12 is varied to simulate the differing temperatures experienced in deep space in the same way as the space simulation chamber of FIG. 1. However, because the space simulation chamber of FIG. 2 includes a liquid nitrogen cooling system, the cooling capacity of this device is considerably greater than that of the FIG. 1 system. As a result, the problems and constraints of the FIG. 1 system due to its gaseous nitrogen only coolant system are largely eliminated in the FIG. 2 design.

When the FIG. 2 system is operated in a constant shroud temperature mode, thermal shroud 12 is kept at a constant, relatively low temperature and the temperature variations in deep space are simulated by intermittently heating the item to be tested with one or more infrared heaters 62 located in the test cavity of the device. This approach simplifies operations, because the shroud temperature is maintained constant. Moreover, although a considerably greater heat duty is generated when infrared heaters are used, this additional heat duty can be easily accommodated by the additional cooling capacity provided by the liquid nitrogen cooling system.

Although a combined liquid/gaseous nitrogen direct cooling system provides some significant advantages over a gaseous nitrogen only cooling system, additional problems and complications can arise. For example, switching between gaseous only and liquid only cooling modes can be complicated and time consuming. Furthermore, liquid nitrogen can cause damage to the test object in the event of a power failure. Moreover, due to the expense of the system and of the test objects, elaborate emergency procedures and/or equipment are often mandated for test facilities employing a liquid nitrogen coolant to cool the thermal shroud.

In light of these problems, it is desirable to create a space simulation chamber that can efficiently operate at temperatures below 110° K without the problems associated with cooling systems using liquid nitrogen to cool the thermal shroud.

SUMMARY OF THE INVENTION

In accordance with the present invention, it has been determined that the above advantages can be achieved by replacing the nitrogen-based cooling systems used for thermal shroud cooling with gaseous cooling systems based on helium or other analogous gases. In accordance with the present invention, it has been determined that, because of its higher heat capacity and lower condensation temperature, helium can achieve substantially the same cooling capacities as conventional cooling systems based on gaseous and liquid nitrogen combined, even though it remains in an essentially gaseous state. As a result, the inventive space simulation chamber can be operated in the same way as the FIG. 2 device described above—i.e., in a constant shroud temperature mode with infrared or other heaters providing temperature variations inside the test cavity—without using the liquid nitrogen auxiliary cooling system previously required to make such systems work.

Accordingly, the present invention provides a new space simulation chamber comprising vacuum chamber, a thermal shroud in the vacuum chamber defining a test cavity therein, and a cooling system for directly cooling of the thermal shroud, wherein the coolant in the cooling system is helium gas or another gas having a specific heat of at least about 1500 J/kg-K and a condensation temperature of 77° K or less at one atmosphere pressure.

BRIEF DESCRIPTION OF THE DRAWINGS

The present invention may be more readily understood by reference to the drawings wherein.

DETAILED DESCRIPTION

Figure 3:
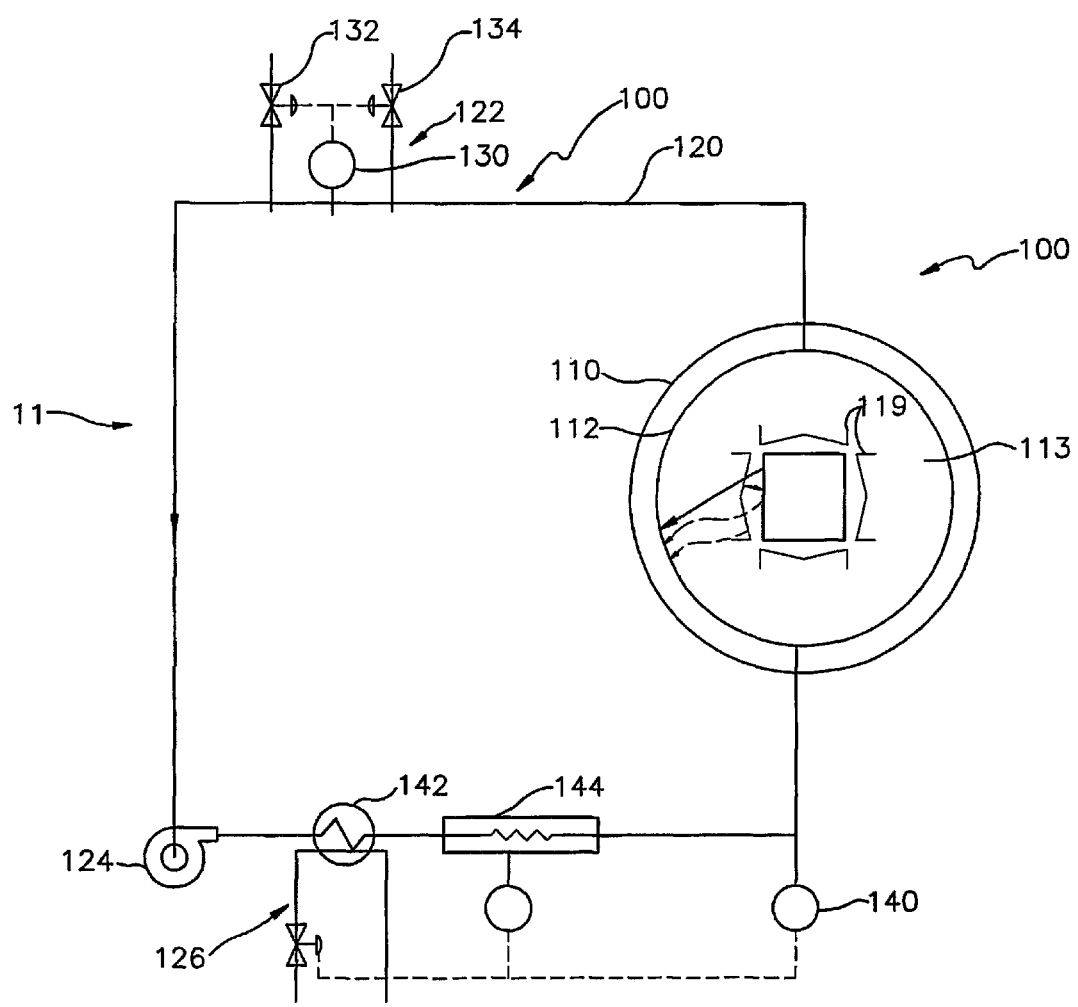
FIG. 3 shows a space simulation chamber in accordance with the present invention in which helium or other analogous gas is used to cool the thermal shroud of the device.

Referring to FIG. 3, the inventive space simulation chamber 100 comprises vacuum chamber 110, thermal shroud 112 and coolant recirculation system 114. Thermal shroud 112 comprises a highly heat-absorptive material which lines the interior of vacuum chamber 110 and defines test cavity 113. One or more coolant tubes, not shown, which are connected to coolant recirculation system 114, are provided for directly cooling thermal shroud 112 by heat exchange between the thermal shroud and a coolant contained in the recirculation system. These coolant tubes can pass through the body of thermal shroud 112, can be arranged on the inside or outside faces of thermal shroud 112, or can be arranged in any other configuration which will allow thermal shroud 112, and hence test cavity 113, to be maintained at the low temperatures required for the deep space simulation testing contemplated herein. One or more variable power infrared heaters 119 can be placed in test cavity 113 for heating a test object therein.

Coolant recirculation system 114 comprises one or more pipe sections 120, pressure regulation system 122, blower 124, and heat regulation system 126. Pressure regulation system 122 comprises pressure controller 130, gaseous helium inlet valve 132 and gaseous helium vent valve 134. Pressure controller 130 measures the pressure of the gaseous helium in coolant recirculation system 114 and sends a signal to open inlet valve 132 or vent valve 134, depending on the pressure set point. Typical operating pressures range from slightly above one atmosphere to approximately ten atmospheres, although pressures as low as 1 atm. or as high as 20 atm. can be employed. Rather than operating in a constant pressure mode, cooling system 114 can also be operated in a constant density, constant volume flow mode, in the same way as described above in connection with the FIG. 1 space simulation chamber, if desired.

Heat regulation system 126 comprises temperature controller 140, cooler 142 and heater 144. In the particular embodiment shown, cooler 142 takes the form of a heat exchanger for heat exchange between the gaseous helium in coolant recirculation system 114 and externally supplied liquid nitrogen. Any other cooling system capable of cooling the gaseous helium in coolant recirculation system 114 can be employed. Temperature controller 140 measures the temperature of the recirculating gaseous helium and sends a signal either to cooler 142 or heater 144 to change temperature, as desired.

Figure 1:
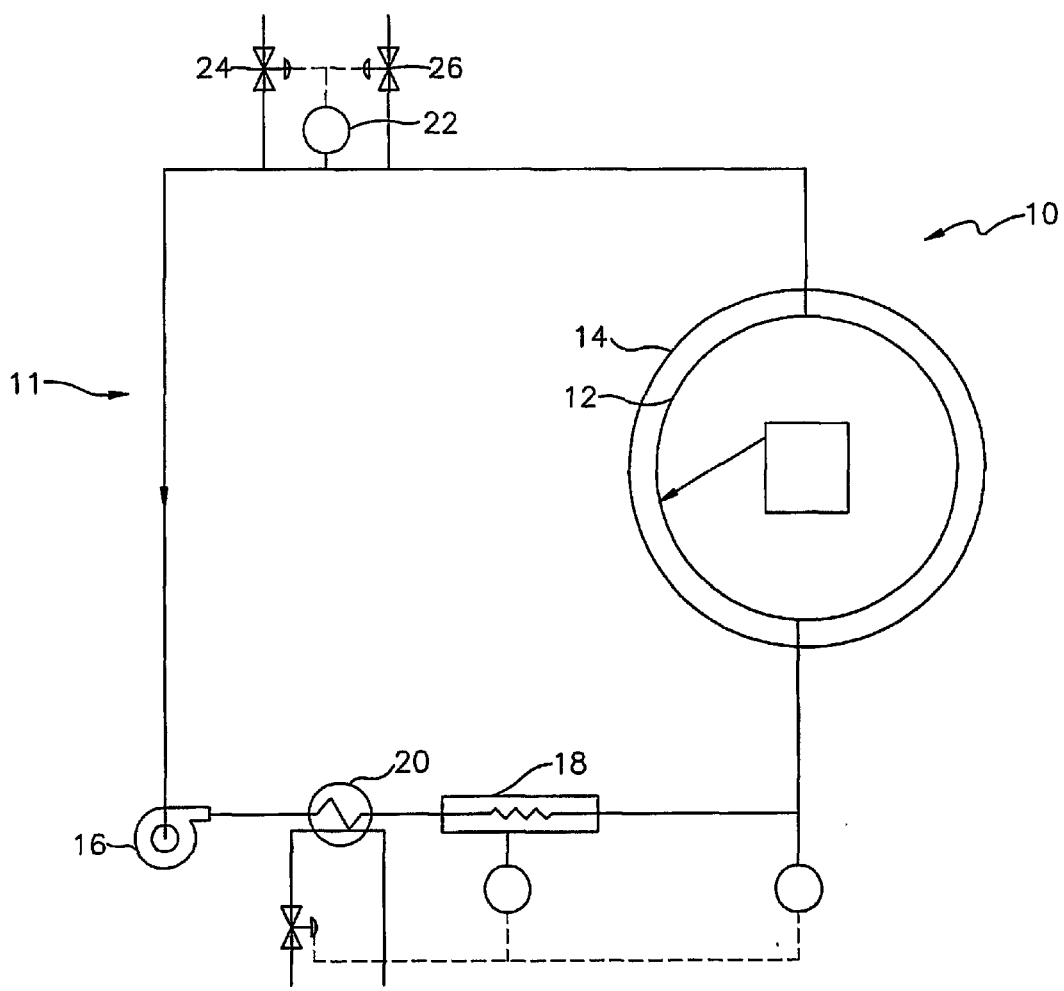
FIG. 1 shows a conventional space simulation chamber wherein gaseous nitrogen only is used to cool the thermal shroud of the device.
Figure 2:
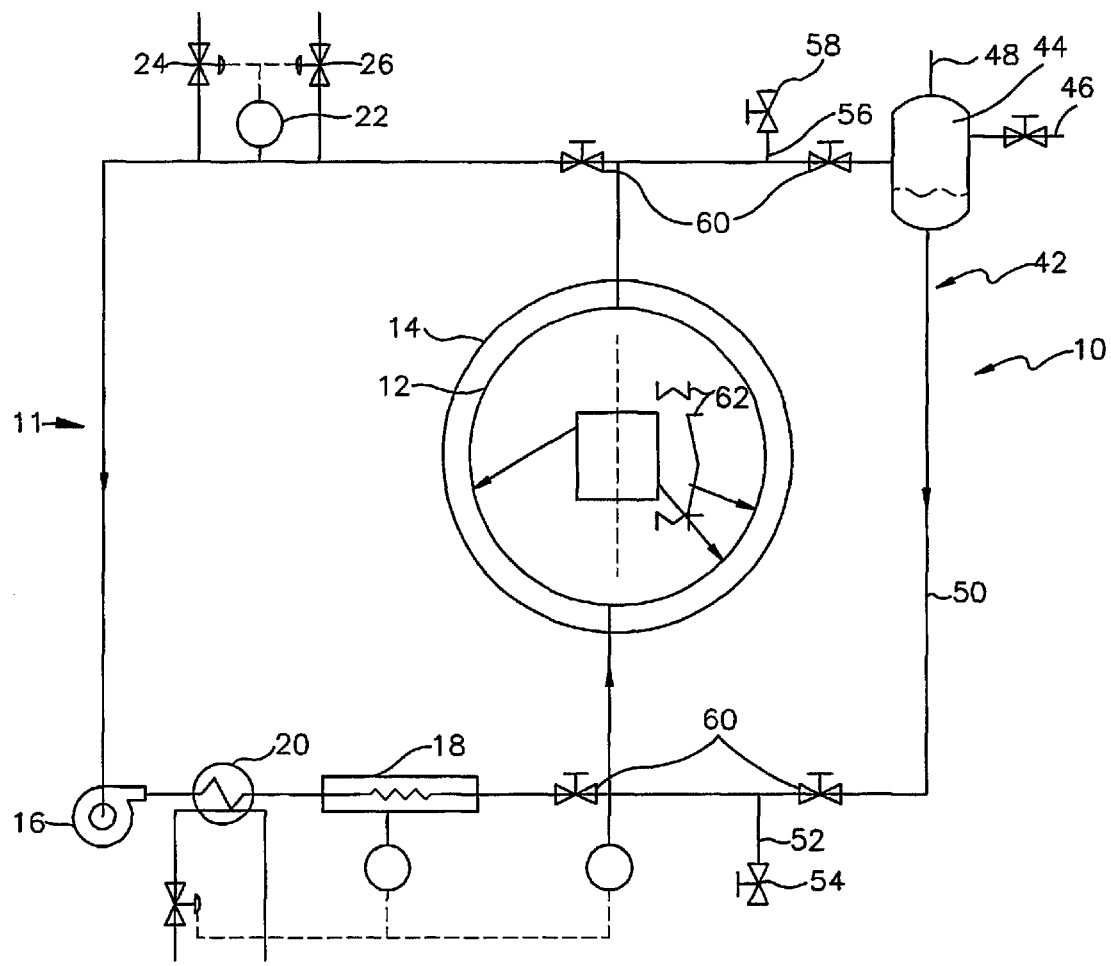
FIG. 2 shows a conventional space simulation chamber in which a combination of liquid nitrogen and gaseous nitrogen is used to cool the thermal shroud of the device.

In accordance with the present invention, gaseous helium or other analogous gases is used as the coolant medium in coolant recirculation system 114. For this purpose, an "analogous gas" is one having a heat capacity of at least about 1500 J/kg-K and a condensation temperature of about 77° K or less at one atmosphere pressure (absolute). Specific examples are hydrogen and hydrogen or helium mixtures including neon. Other Gas mixtures can also be used so long as the mixture has a condensing temperature of less than 77° K and a specific heat of greater than 1500 J/kg-K. Indeed, even nitrogen or other gases not having these properties can be included within a coolant mixture, so long as the mixture as a whole has these properties. Because of its higher heat capacity and/or lower condensation temperature relative to nitrogen, helium and other analogous gases can provide as much as or even more cooling capacity than conventional combined gaseous/liquid nitrogen cooling systems. Accordingly, space simulation chambers having the simplicity of design of gaseous nitrogen only cooling systems, such as illustrated in FIG. 1, can be provided with the cooling capacities of the combined gaseous/liquid nitrogen cooling systems such as illustrated in FIG. 2. This, in turn, allows space simulation chambers having gas only shroud cooling systems to be operated in the constant shroud temperature mode using infrared or other heating in the test cavity for temperature variations, which was previously possible only with devices having liquid nitrogen shroud cooling systems.

Further advantages of the inventive space simulation chamber are that it is simpler in design and less expensive to build and operate than prior art designs, because the pipe and valve requirements of the inventive design are dramatically reduced. Moreover, the additional safety equipment and/or procedures which are required when liquid nitrogen shroud cooling systems are used, as explained above in connection with FIG. 2, are avoided by the present invention since liquid nitrogen shroud cooling has been eliminated. In addition, use of gaseous helium or analog as the coolant allows over a three-fold increase in capacity and a three-fold decrease in blower power requirements compared with a nitrogen-based gas-only system of the same volumetric flow rate.

Designing a space simulation chamber for a particular application in accordance with the present invention can be easily accomplished by persons of ordinary skill in the art. In this connection, those skilled in the art understand that the total cooling capacity provided by a cooling system depends not only on the properties of the coolant used, but also on the size of the system. Those skilled in the art readily understand that, to achieve a cooling system of a desired cooling capacity, the size of the cooling system in terms of the parameters controlling total coolant mass flow rate (e.g., individual pipe cross-sectional area, total pipe cross-sectional area, pressure, blower capacity, etc.) must be suitably selected in light of the coolant heat capacity and associated heat transfer coefficients in accordance with well-known engineering principles. Accordingly, one skilled in the art should have no difficulty in designing space simulation chambers for particular applications in accordance with the principles of the present invention.

Finally, it should be appreciated that, when the above description refers to direct cooling of the thermal shroud, it is referring to the type of cooling achieved when the coolant is made to flow through tubes or other devices in physical contact with the shroud or through passageways through the shroud. It does not refer to the type of cooling which would occur, for example, with coolers 20 in FIGS. 1 and 2 in which a first coolant is used to cool a second coolant in a location physically remote from the shroud and then the second coolant is used to directly cool the shroud.

Although only a few embodiments of the present invention have been described above, it should be appreciated that many modifications can be made without departing from the spirit and scope of the invention. All such modifications are intended to be included within the scope of the present invention, which is to be limited only by the following claims.

What is claimed is:

1. Apparatus for simulating the temperature and pressure conditions of outer space comprising:

a vacuum chamber, a thermal shroud in the vacuum chamber defining a test cavity therein, and a cooling system for direct cooling of the thermal shroud by a coolant within the cooling system, wherein the coolant is a gas having a specific heat of at least about 1500 J/kg-K and a condensation temperature of at most 77° K.

2. The apparatus of claim 1, wherein the coolant is selected from a group consisting of helium, hydrogen, any mixtures thereof, and mixtures including neon.

3. The apparatus of claim 2, wherein the coolant is helium.

4. Apparatus for simulating the temperature and pressure conditions of outer space comprising:

a vacuum chamber, a thermal shroud in the vacuum chamber defining a test cavity therein, and a cooling system for direct cooling of the thermal shroud by helium within the cooling system, wherein the helium is a gas having a specific heat of at least about 1500 J/kg-K and a condensation temperature of at most 77° K; and further comprising at least one heater inside the vacuum chamber for heating a test object located in the test cavity.

5. The apparatus of claim 4, further comprising a control system for maintaining the thermal shroud at an essentially constant temperature below 110° K.

6. The apparatus of claim 5, wherein the control system maintains the thermal shroud at a temperature of at most about 100° K.

7. The apparatus of claim 5, wherein the heater or heaters, together with the cooling system, are capable of varying the temperature of the test cavity between about 100° K and about 293° K.

8. The apparatus of claim 7, wherein the heater or heaters, together with the cooling system, are capable of varying the temperature of the test cavity between about 100° K and about 293° K without direct cooling of the thermal shroud with a liquid coolant.

9. A method of subjecting a test object to the vacuum pressures and variable temperatures encountered in deep space comprising:

placing the object in the test cavity of a space simulation chamber having a vacuum chamber provided with a shroud of thermal insulation defining the test cavity, and directly cooling the thermal shroud to a test temperature varying between 100° K or less and about 293° K or more with a coolant gas having a specific heat of at least about 1500 J/kg-K and a condensation temperature of at most about 77° K.

10. The method of claim 9, wherein the coolant gas is selected from a group consisting of helium, hydrogen, and mixtures thereof, and mixtures including neon and nitrogen.

11. The method of claim 10, wherein the coolant is helium.

* * * * *